United States Patent [19]
Greenleaf et al.

[11] 3,983,753
[45] Oct. 5, 1976

[54] THERMISTOR HOLDER FOR SKIN TEMPERATURE MEASUREMENTS

[75] Inventors: John E. Greenleaf, Sunnyvale; Bill A. Williams, Morgan Hill, both of Calif.

[73] Assignee: The United States of America as represented by the United States National Aeronautics and Space Administration, Washington, D.C.

[22] Filed: Sept. 29, 1975

[21] Appl. No.: 617,612

[52] U.S. Cl. ............................ 73/343 R; 128/2 H
[51] Int. Cl.² ........................................ G01K 1/14
[58] Field of Search ...................... 73/340–342, 73/343 R, 361; 136/221, 23 S; 128/2 H

[56] References Cited
UNITED STATES PATENTS

| | | | |
|---|---|---|---|
| 1,648,942 | 11/1927 | Hayman | 128/2 H |
| 2,195,019 | 3/1940 | Bloomheart | 128/2 H X |
| 3,099,162 | 7/1963 | Imperial et al. | 73/340 X |
| 3,253,466 | 5/1966 | Chough | 73/343 R |
| 3,258,969 | 7/1966 | Poirier | 73/361 |

Primary Examiner—Richard C. Queisser
Assistant Examiner—Frederick Shoon
Attorney, Agent, or Firm—Darrell G. Brekke; Armand G. Morin, Sr.; John R. Manning

[57] ABSTRACT

An improved thermistor holder structure is disclosed which facilitates skin-temperature measurement. The device includes a cylindrical plastic housing with tab extensions that permits the apparatus to be held to a skin surface by suitable elastic members or the like. Ventilation openings are provided in the plastic housing to permit air circulation. An adjustable, resilient metal arm with a thermistor holding cup formed at one end is secured to the interior surface of the plastic housing such that the holding cup is located at the center of the housing. A thermistor temperature sensor is inserted into and held in the cup by interference fit.

4 Claims, 2 Drawing Figures

THERMISTOR HOLDER FOR SKIN TEMPERATURE MEASUREMENTS

ORIGIN OF THE INVENTION

The invention described herein was made by employees of the United States Government and may be manufactured and used by or for the Government for Governmental purposes without the payment of any royalties thereon or therefor.

BACKGROUND OF THE INVENTION

1. Field of the Invention

The present invention relates generally to thermistor holders and more particularly to a thermistor holder for skin-temperature measurements.

2. Description of the Prior Art

It is often necessary to measure the skin temperature of humans and animals to ascertain the effects on body temperatures resulting from the use of various types of drugs, exposures to selected environments, and many other situations.

In the past a number of different devices have been used for coupling temperature measuring electronic devices to humans and animals for sensing skin temperature. For example, a thermocouple holding button is disclosed in U.S. Pat. No. 3,464,864 to Rentz. The device disclosed in this patent consists essentially of a circular base having a thermocouple secured to one surface thereof, with a neck portion surmounted by a head formed integrally with the opposite surface thereof to permit a fastening device, such as an elastic band, to be coupled to the holding member. This device presses the thermocouple into the skin according to the force of the elastic band used to secure the holding member in place. Furthermore, no air circulation is permitted beneath the holding member so that the skin temperature in this region may be increased somewhat above normal, and sweat may form around the thermocouple member without the possibility of evaporation by normal air circulation.

A different type of surface contacting thermocouple holder is disclosed in U.S. Pat. No. 3,573,993 to Senbokuya. The device disclosed in this reference includes a thin band-like thermocouple member bent into a U-shape configuration and mounted to a pair of auxiliary springs which are in turn rigidly fastened to a fitting implement or support member. The device disclosed in this patent is complicated and delicate in its manufacture due to the use of various exposed spring members and is not easily fastened to a skin surface in view of the relative instability created by the particular use of the band-like thermocouple and auxiliary supporting springs. Thus, the apparatus disclosed in this patent is impractical for use in continuously monitoring skin temperatures, particularly during physical exercise, in view of the difficulties created in securing it in place and in view of its delicate structural configuration.

Another type of conventional mounting apparatus for skin temperature measurement is disclosed in U.S. Pat. No. 3,258,969 to Poirier wherein a conventional wrist-strap is used to secure a diaphragm shielded thermocouple in place on the arm of a wearer. Again, this device lacks flexibility in permitting separate adjustment of the securing means and the tension of the thermocouple against the skin and also inhibits the circulation of air over the surface of the skin in the region of the thermocouple.

The devices described above illustrate deficiencies in previously known apparatuses for holding skin temperature sensing units in place. Generally, they do not permit adequate air circulation over the surface of the skin in the region of the temperature sensing device, thus permitting the skin temperature to increase above its normal value, rendering measurements unreliable. Furthermore, the lack of air circulation can cause localized accumulations of sweat in the area of the electronic sensing device which can in turn result in corrosion of the device or its supporting members. Holding devices of the type described also generally lack the ability to separately adjust the restraining force for holding the members in place and the biasing force holding the temperature sensitive element into contact with the skin. Since skin temperature is directly related to the depth the sensor is pressed into the skin, it is often desirable to secure a holding member in place with a relatively large force and yet to press the thermalsensing member into engagement with the surface of the skin with a small force in order to prevent errors in temperature measurement. Accordingly, separate adjustment of these two forces is desirable.

SUMMARY OF THE INVENTION

Accordingly, one object of this invention is to provide a novel structure for securing a skin-temperature measuring apparatus in place.

Yet another object of the present invention is the provision of a novel holder for a skin temperature sensitive device which permits air circulation in the vicinity of the temperature sensitive device.

A still further object of the present invention is the provision of a novel holder for a skin temperature sensor which permits separate adjustments of the force securing the holding member in place and the force holding the temperature sensor into engagement with a wearer's skin.

A still further object of the present invention is the provision of a novel thermistor holder for skin-temperature measurements of a simple, improved design and low cost manufacture.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENT

Figure 1:
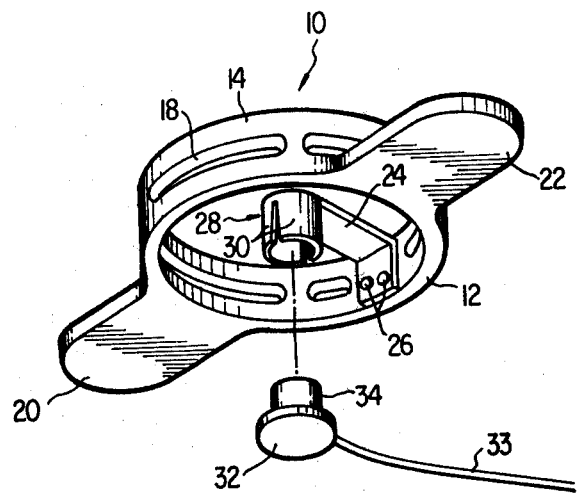
FIG. 1 is a partially exploded perspective illustration of the apparatus of the present invention emphasizing the interior details thereof; and, FIG. 2 is an illustration of the apparatus of FIG. 1 secured in place to the arm of a human being.

Referring now to the drawings, wherein like reference numerals designate identical or corresponding parts throughout the several views, and more particularly to FIG. 1 thereof, the apparatus of the present invention is illustrated in detail. More particularly, the apparatus of the invention includes a holder body 10 preferably formed of a conventional clear acrylic plastic material, although other conventional plastics may also be used. The holder body includes a generally circular central portion 12 having a short cylindrical wall 14. A series of elongated apertures 18 are provided around the circumference of the cylindrical wall 14 to permit air circulation in the region surrounded by the cylindrical wall 14 and to permit electrical leads to pass through the cylindrical wall.

A pair of tab extensions 20 and 22 are formed integrally with the central portion 12 of the holder body 10 and extend outwardly in opposite directions from the central point of the holder body. The tab extensions help to stabilize the holder body when it is in operative position and provide attachment points for tapes or elastic bands, as will be described in more detail subsequently.

A tension arm 24, preferably formed of brass shim stock, is attached by screws 26 or any equivalent fastening means to the cylindrical wall 14 of the holder body. A retaining cup 28, which may be formed integrally with the tension arm 24 or which may be secured by conventional means to the tension arm, is positioned at the center of the region surrounded by cylindrical wall 14. The retaining cup 28 is slotted on both sides to create a pair of semi-circular gripping members 30 for holding a temperature sensitive element in place.

The tension arm 24 may be bent to provide the desired biasing force at the position of the retaining cup 28 and thus may be calibrated to provide the optimum surface pressure for biasing a temperature sensitive element into engagement with the surface of the skin to be measured.

A thermistor 32 of a conventional type having an electrical lead 33, a ceramic non-sensing surface and a conventional thermally conductive sensing surface is shown positioned above the retaining cup 28. A mounting stud 34, preferably formed of stainless steel tubing, is secured with epoxy glue, for example, to the non-sensing surface of the thermistor 32 for frictionally interfitting with the gripping members 30 of the retaining cup 28, whereby the thermistor 32 is held in place within the holder body 10.

Although the basic concepts of the present invention are not limited by any specific dimensional parameters, the following exemplary parameters are provided to further illustrate the structural dimensions of the present invention. The central portion 12 of the holder body 10 preferably has a diameter of approximately 3.7 cm., while the tab extensions 20 and 22 are each approximately 2 cm. in length. The retaining cup 28 is preferably 7 millimeters in diameter, corresponding substantially to the exterior diameter of the mounting stud 34, which is preferably approximately 5 millimeters in length.

Figure 2:
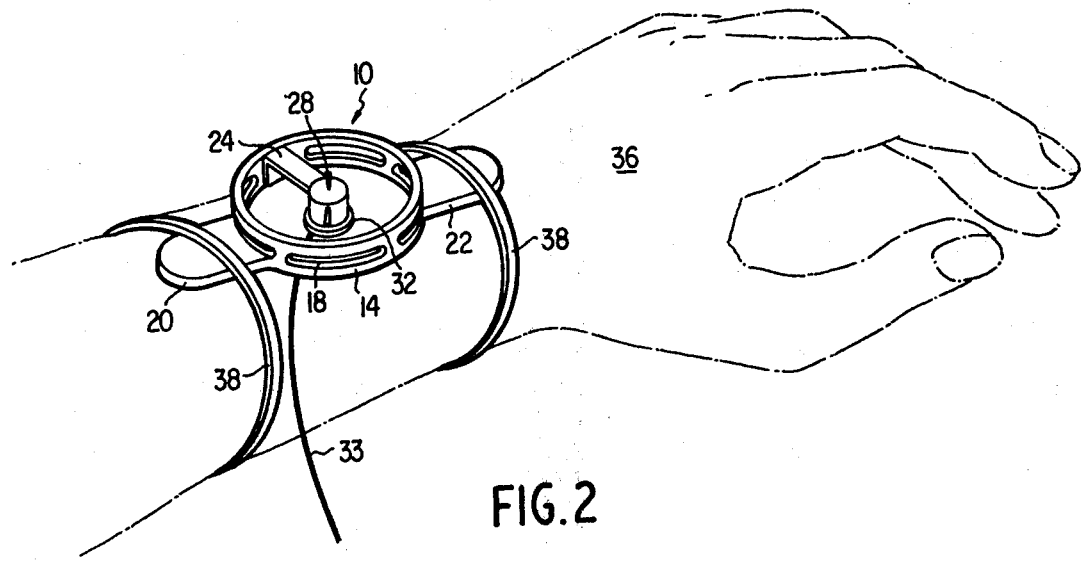

Attention is now directed to FIG. 2 wherein the apparatus of the present invention is shown in position on an arm 36. A pair of elastic bands 38, which may be conventional rubberbands for example, are shown passing over the extension tabs 20 and 22 to hold the holder body 10 of the invention in place. Clearly, other types of elastic members, adhesive tape or various types of adjustable straps could be used in place of the illustrated rubberbands to hold the apparatus of the invention in place. The rubber buffers may be used to add flexibility when non-elastic bands are used to hold the holder in place.

In operation, the tension arm 24 is first bent to provide the desired amount of contact tension between thermistor 32 and the skin to be measured. The thermistor is coupled to the holder body by insertion of the mounting stud 34 into the retaining cup 28, whereby the thermistor is snugly retained in place within the holder body structure. The thermistor lead 33 is then passed through one of the apertures 18 in the cylindrical wall 14 for connection to appropriate electrical equipment. The assembled holder body and heat sensitive element are then retained in place by the use of suitable elastic bands, or equivalent means, as shown in FIG. 2 such that the heat sensitive side of the thermistor is in engagement with the skin surface to be monitored. When the device is in place, air is permitted to circulate through the elongated apertures 18 into the region surrounded by the cylindrical wall 14 so that the effect of the holder body itself on the skin area to be monitored is minimized. In particular, temperature and moisture accumulations due to sweat, for example, are substantially reduced or eliminated according to the present invention by the air circulation which evaporates moisture and maintains normal skin temperature within the zone covered by the holder body.

Obviously, numerous modifications and variations of the present invention are possible in light of the above teachings. It is therefore to be understood that within the scope of the appended claims, the invention may be practiced otherwise than as specifically described herein.

What is claimed is:

1. An apparatus for holding a temperature sensitive element for monitoring skin temperature, comprising:
   an enclosure having two open ends, one of which is adapted to be placed against said skin;
   a peripheral wall surrounding said enclosure, said peripheral wall including a plurality of apertures for permitting air circulation within said enclosure;
   resilient support means secured to the interior of said enclosure for retaining said temperature sensitive element, said resilient support means being adjustable to adjust the biasing force exerted by said temperature sensitive element against said skin, said resilient support means including an arm coupled to said peripheral wall on an interior surface of said enclosure; and
   tab means secured to said enclosure for retaining said enclosure in place.

2. An apparatus as in claim 1, wherein:
   a retaining cup including at least a pair of resilient retaining members is secured to one end of said resilient support means.

3. An apparatus as in claim 2, wherein:
   said retaining cup is positioned at the center of said enclosure, and said enclosure is of a generally cylindrical configuration.

4. An apparatus as in claim 1, wherein:
   said tab means includes a pair of elongated tabs positioned on opposite sides of said enclosure and extending outwardly therefrom.

* * * * *